Figure 1:
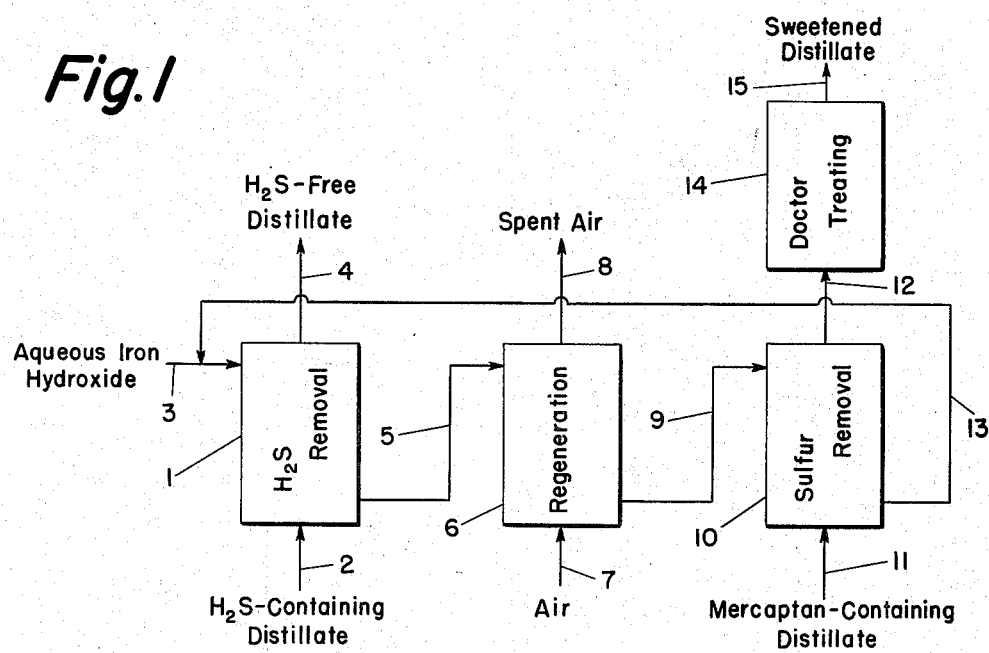

Nov. 4, 1952

K. E. LEUTZ 2,616,834

REMOVAL OF OBJECTIONABLE SULFUR COMPOUNDS
FROM MINERAL OIL DISTILLATES

Filed Dec. 7, 1949

INVENTOR.
KOERNER E. LEUTZ

BY

*Busser and Harding*

ATTORNEYS

Patented Nov. 4, 1952

2,616,834

UNITED STATES PATENT OFFICE 2,616,834

REMOVAL OF OBJECTIONABLE SULFUR COMPOUNDS FROM MINERAL OIL DISTILLATES

Koerner E. Leutz, Toledo, Ohio, assignor to Sun Oil Company, Philadelphia, Pa., a corporation of New Jersey Application December 7, 1949, Serial No. 131,626

10 Claims. (Cl. 196—30)

This invention relates to the removal of objectionable sulfur compounds from mineral oil distillates. More particularly, it relates to the removal of objectionable sulfur compounds including hydrogen sulfide from mineral oil distillates by contact in liquid phase with a regenerable aqueous treating agent.

The presence of hydrogen sulfide in light mineral oil distillates, e. g. gasoline, kerosene, and naphtha, cannot, as a general rule, be tolerated. Therefore, removal of hydrogen sulfide from such distillates is a frequently necessary refining operation. Up to the present time, a variety of methods have been proposed for hydrogen sulfide removal, but none is without serious disadvantage.

The most widely practiced method is caustic soda treatment, wherein the distillate is contacted in liquid phase with aqueous sodium hydroxide. During the period of contact, hydrogen sulfide is removed from solution in the oil to react with sodium hydroxide and form compounds which are removed with the caustic sludge obtained by separation from the distillate. The use of caustic soda for removal of hydrogen sulfide is so generally practiced that, where hydrogen sulfide containing distillates are concerned in the prior art, caustic treatment is impliedly the initial refining step, whether it is specifically disclosed or not.

Caustic soda treatment, though widely used, has the disadvantage that the caustic sludge formed is not readily regenerable. Usual practice is to discard the sludge. However, even the latter course is not completely satisfactory, because it is frequently difficult to dispose of the sludge in such a way as to prevent its constituting a public nuisance.

The present invention provides a method for hydrogen sulfide removal utilizing an acidic aqueous treating agent which can be readily regenerated, thereby making possible considerable economies in the cost of the treating agent, and also eliminating the problem of disposing of large quantities of spent treating agent.

The invention also provides, using such a treating agent, a method whereby the hydrogen sulfide content of distillates can be converted to elementary sulfur, which can be incorporated in mercaptan-containing distillates, in order to prepare the latter distillates for doctor treatment.

Doctor treatment is a method for removing objectionable sulfur compounds including mercaptans from distillates, and involves contacting such distillates with an aqueous solution of sodium plumbite. In order to convert the mercaptans to non-objectionable sulfur compounds, it is necessary that elementary sulfur, in a definite quantity relative to the amount of mercaptans, be present in the distillate charged to the doctor treatment or at least be present during the final stage of the doctor treatment.

According to one embodiment of the present invention, hydrogen sulfide is removed from distillates by contacting the latter with an acidic aqueous treating agent comprising suspended iron hydroxide. In another embodiment, the invention contemplates the use of such a treating agent for converting hydrogen sulfide to elementary sulfur and adding the latter to a mercaptan-containing distillate which contains no elementary sulfur or contains elementary sulfur in amount substantially less than that required by the necessary proportion of elementary sulfur to mercaptans in the distillate. By adding enough sulfur to obtain the required ratio of sulfur to mercaptans, the mercaptan-containing distillate is prepared for optimum doctor treating.

The treating agent employed according to the invention is an acidic aqueous suspension of iron hydroxide. Ferrous or ferric hydroxide or both may be present. The treating agent may be prepared by reacting an aqueous solution of an iron salt of a strong acid with a basic compound to precipitate iron hydroxide, and acidifying the resulting suspension until its pH is below 7. Other preparation methods are not excluded from the scope of the invention. If the ions other than iron and hydroxyl which enter into the above reaction do not form a water-insoluble salt, the hydroxide of iron may, by filtration, be obtained substantially free of other materials and may be suspended in water to give a treating suspension containing no substantial amount of dissolved material other than the small amount of iron hydroxide which dissolves in the water. The presence of substantial amounts of other dissolved material in the treating agent is not, however, detrimental to the action thereof, according to the invention, and the filtration step is therefore not strictly necessary. The iron salt used in preparing the treating agent is preferably ferrous sulfate, but any other soluble iron salt of a strong acid, e. g. ferrous chloride, may also be used. The basic compound is preferably an alkali metal hydroxide, but other basic compounds, e. g. alkali metal tetraborate, alkali metal acetate, or ammonium hydroxide, may also be used.

The treating agent employed according to the invention is acidic, because it has been found that neutral or alkaline treating agents are not readily regenerated according to the invention. The pH of the treating agent is preferably at least 4, because at lower pH the treating agent becomes unduly corrosive.

Ferric hydroxide is substantially water-insoluble, even in aqueous media having pH as low as 4. Ferrous hydroxide is not as insoluble as ferric hydroxide, but its solubility is still low, even in acidic aqueous media. It is therefore possible to maintain an excess of solid iron hydroxide in acidic treating agents employed according to the invention.

Ferrous hydroxide is readily converted to ferric hydroxide under oxidizing conditions, and ferric hydroxide to ferrous hydroxide under reducing conditions. Since, in the use of a treating agent according to the invention, the treating agent generally encounters both oxidizing and reducing conditions, as subsequently described, the treating agent generally contains at a given time both ferrous and ferric hydroxide. The pH of the treating agent depends in part upon the relative amounts of ferrous and ferric hydroxide therein, the pH being lower the more ferric hydroxide relatively is present. Therefore, the pH of the treating agent may be lowered, not only by adding an acid, but by oxidizing ferrous hydroxide to ferric hydroxide, e. g. by blowing air through the treating agent. Also, the pH may be raised, not only by adding a base, but by reducing ferric hydroxide to ferrous hydroxide. Maintenance of the pH of the treating agent at the desired value may be accomplished by using any of the above means for raising or lowering the pH.

The concentration of iron in the treating agent may vary. Concentrations of solid iron hydroxide within the range 0.05–0.8 mole per liter have been found satisfactory. It is inadvisable to use concentrations above 0.8 mole per liter, because the suspension then becomes too viscous to be handled readily. Optimum results are obtained with iron hydroxide concentrations within the range 0.3–0.5 mole per liter.

When the treating suspension is prepared by adding a base to an aqueous solution of a water-soluble iron salt, the amount of base added is preferably not substantially greater than that required to precipitate all of the iron ion as iron hydroxide. When alkali metal hydroxide or alkali metal acetate is used to precipitate ferrous sulfate, the number of moles of basic compound added to a liter of solution should be at least 0.1 and not substantially greater than twice the number of moles of ferrous salt in the original solution. When alkali metal tetraborate is used as the basic compound, the number of moles added to a liter of solution is preferably within the range 0.05–0.1; when more than 0.1 mole is used, the suspension becomes viscous and difficult to handle.

In the process of the invention, a treating agent prepared as described above is contacted with a mineral oil distillate containing hydrogen sulfide, and hydrogen sulfide is removed from the distillate to react with iron in the treating agent and to thereby form iron sulfide precipitate in the treating agent. The reaction proceeds at a satisfactory rate, even in an acidic aqueous medium, because the hydrogen ion formed in the precipitation reaction reacts, as it is formed, with the excess solid iron hydroxide in the treating agent; thus the hydrogen ion concentration is prevented from building up and retarding, by the mass action effect, the precipitation reaction. It is noted that, during the precipitation, ferric iron if present is probably reduced at least in part to ferrous iron.

When the treating agent becomes contaminated by iron sulfide accumulation, it may be regenerated by oxidizing the iron sulfide to form elementary sulfur. Such oxidation may be accomplished by contacting the contaminated treating agent, in acidic condition, with free-oxygen containing gas, e. g. air. It is noted that during such oxidation, ferrous hydroxide is probably oxidized at least in part to ferric hydroxide.

The regenerated treating agent contains both iron hydroxide and elementary sulfur in suspension. Before re-using the regenerated treating agent for hydrogen sulfide removal, the elementary sulfur is removed by any suitable means, e. g. by a flotation method wherein the regenerated treating agent is agitated with a gas under conditions such that the sulfur becomes concentrated in a removable layer of foam above the treating agent.

A preferred method, however, for removing elementary sulfur is by extraction from the regenerated treating agent by contact with a mercaptan-containing distillate, thereby increasing the elementary sulfur content of that distillate to an optimum value for subsequent doctor treatment.

When the hydrogen sulfide containing distillate treated according to the invention also contains mercaptans, that same distillate may be used, after hydrogen sulfide removal, for extraction of sulfur from the regenerated treated agent thereby producing a distillate containing mercaptans and elementary sulfur in proportions suitable for subsequent doctor treatment. However, when the above situation prevails, it is preferred that the hydrogen sulfide removal, treating agent regeneration, and sulfur removal steps be performed substantially simultaneously in a single operation by contacting a distillate simultaneously with free-oxygen containing gas and with the treating agent. When this is done, hydrogen sulfide removal from the distillate, iron sulfide oxidation, and sulfur extraction by the distillate occur simultaneously. Thus, in effect, a distillate containing hydrogen sulfide and mercaptans is contacted with an aqueous treating agent comprising iron hydroxide, iron sulfide, and elementary sulfur, and has its hydrogen sulfide content thereby replaced with elementary sulfur. The distillate containing mercaptans and elementary sulfur is then doctor treated. The treating agent is continuously regenerated and can be used for treating an indefinite quantity of distillate.

Hydrogen sulfide removal by contact with a treating agent according to the invention is preferably conducted at ordinary temperature without heating; little advantage is to be derived from contacting at elevated temperature. However, regeneration of contaminated treating agent by oxidation of iron sulfide therein proceeds more rapidly at elevated temperature than at ordinary temperature without heating. Therefore, when hydrogen sulfide removal and treating agent regeneration are performed simultaneously in a single operation, it may be advisable in some instances to operate at elevated temperature.

Figure 2:
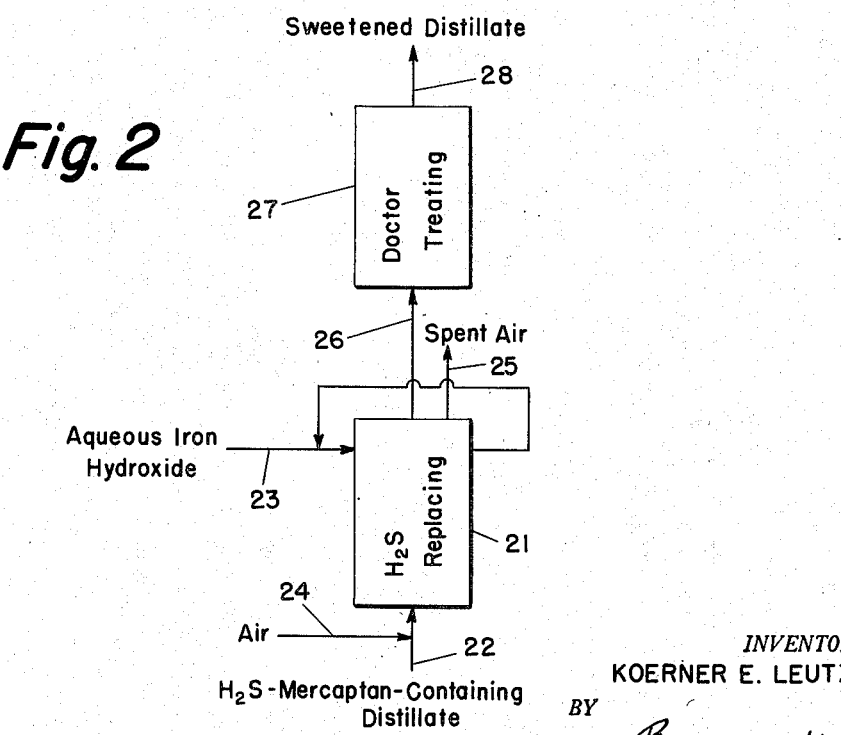

The invention will be described in further detail with reference to the attached drawings. Figure 1 illustrates a method for removing hydrogen sulfide from a distillate containing the same by contacting the distillate with a regenerable aqueous treating agent comprising iron hydroxide; Figure 1 also shows such hydrogen sulfide removal as a step in a larger process whereby a mercaptan-containing distillate is also prepared for doctor treatment. Figure 2 illustrates a preferred method of replacing hydrogen sulfide with elementary sulfur in a mercaptan-containing distillate, thereby preparing that distillate for doctor treatment.

Turning now to Figure 1, a light petroleum distillate containing hydrogen sulfide is introduced by way of line 2 into hydrogen sulfide removal apparatus 1, which may be any apparatus suitable for containing and subsequently separating two immiscible liquid phases, one of which contains solids in suspension; contacting and separating is preferably continuous, as obtained for example with countercurrent flow through a packed tower. Through line 3, a treating agent according to the invention is introduced into hydrogen sulfide removal apparatus 2. Treated distillate having its hydrogen sulfide content substantially reduced or eliminated by contact with the treating agent is removed through line 4.

Contaminated treating agent, containing in suspension iron sulfide formed upon contact with hydrogen sulfide containing distillate, is removed from hydrogen sulfide removal apparatus through line 5 and introduced into treating agent regeneration apparatus 6, which may be any apparatus for contacting and subsequently separating, preferably continuously, a gas and a liquid containing solids in suspension. Air is introduced into regeneration apparatus 6 through line 7; spent air, depleted in oxygen content by contact with contaminated treating agent, leaves regeneration apparatus 6 through line 8.

Regenerated treating agent, containing in suspension elementary sulfur formed by oxidation of iron sulfide, is removed from regeneration apparatus 6 through line 9 and introduced into sulfur removal apparatus 10, which may be any apparatus suitable for contacting and subsequently separating, preferably continuously, two immiscible liquid phases, one of which contains solids in suspension. A mercaptan-containing distillate, which should be substantially free of hydrogen sulfide, and which contains either no elementary sulfur or elementary sulfur in molar amount substantially less than that required for the mercaptans, is introduced into sulfur removal apparatus 10 through line 11. The relative rates of introduction of regenerated treating agent through line 9 and of mercaptan-containing distillate through line 11 are adjusted in such a way that the contacted distillate withdrawn through line 12 contains elementary sulfur and mercaptans in the proportions necessary for doctor treating. It is within the ability of a person skilled in the art to determine for a given mercaptan-containing distillate the quantity of elementary sulfur required for doctor treating.

Regenerated desulfurized treating agent is removed from sulfur removal apparatus 10 through line 13 and returned, by way of line 3, to hydrogen sulfide removal apparatus 1 for further contact with hydrogen sulfide containing distillate. The sulfur- and mercaptan-containing distillate withdrawn from sulfur removal apparatus 10 through line 12 is introduced into doctor treating apparatus 14, which may be of any type known in the doctor treating art. By virtue of the fact that the distillate in line 12 has been adjusted to the proper sulfur-mercaptan ratio, no additional sulfur need be added to the doctor treating operation, and sweetened distillate containing no objectionable sulfur compounds is withdrawn through line 15.

In operation according to Figure 1, it is to be understood that part of the treating agent may by-pass the regeneration and sulfur removal operations in the treating agent cycle.

If the hydrogen sulfide containing distillate in line 2 also contains mercaptans, it is within the scope of the invention to utilize the mercaptan-containing, $H_2S$-free, distillate in line 4 as the extracting distillate introduced into sulfur removal apparatus 10 through line 11. Such operation is, however, unnecessarily costly in that it involves three steps separately performed which can be replaced by one step, as shown in Figure 2.

In Figure 2, a light mineral oil distillate containing both hydrogen sulfide and mercaptans is introduced through line 22 into hydrogen sulfide replacing apparatus 21, which may be any apparatus suitable for contacting and subsequently separating, preferably continuously, two immiscible liquid phases, one containing suspended solids, in the presence of a gas. Through line 23, a treating agent according to the invention is introduced into hydrogen sulfide replacing apparatus 21. Air is introduced through line 24 into line 22, but it is within the scope of the invention to introduce air separately into hydrogen sulfide replacing apparatus 21.

Treating agent may either be circulated continuously through hydrogen sulfide replacing apparatus 21, or it may be permanently disposed therein, while air and distillate are continuously passed therethrough. In either case, when operation has become stabilized, the treating agent within apparatus 21 is an aqueous suspension of iron hydroxide, iron sulfide, and elementary sulfur, which continuously removes hydrogen sulfide from the distillate, gives up sulfur to the distillate, and has its iron sulfide content oxidized to elementary sulfur by the air. In operation according to Figure 2, the treating agent should be acidic, in order to allow satisfactory oxidation of iron sulfide.

The distillate withdrawn through line 26 has given up hydrogen sulfide to the treating agent and has extracted elementary sulfur therefrom. The rates of introduction of air, distillate, and treating agent into apparatus 21 are so adjusted that the distillate withdrawn through line 26 contains elementary sulfur in molar amount preferably not substantially greater than that required for the mercaptans. If the hydrogen sulfide content of the distillate in line 22 is greater than the amount which, upon conversion to elementary sulfur, yields the required amount of the latter, a portion of the treating agent may be removed from apparatus 21 and separately treated for sulfur removal according to the method illustrated in Figure 1.

Deficiencies of either elementary sulfur or mercaptans in the distillate in line 26 can also be corrected by addition thereto from external sources of similar distillates which are rich in mercaptans or elementary sulfur respectively.

It is to be understood that, where doctor treating is disclosed in the present specification, other known processes, which require definite quantities of elementary sulfur in relation to mercaptan content of the distillate charged, are to be considered substantially equivalent.

I claim:

1. The method of removing hydrogen sulfide from a light mineral oil distillate containing the same which comprises: contacting said distillate in liquid phase with an aqueous treating agent comprising iron hydroxide in suspension, said treating agent having been prepared by precipitating iron hydroxide from an aqueous solution containing iron ions by addition of a basic compound to said solution and acidifying the resulting suspension until its pH is below 7 and at least 4; and maintaining said distillate substantially entirely in liquid phase during said contacting.

2. Method according to claim 1 wherein said aqueous solution is an aqueous solution of ferrous sulfate and said basic compound is an alkali metal hydroxide.

3. Method according to claim 2 wherein the amount of said ferrous sulfate is within the range 0.05–0.8 mole per liter of solution and the amount of alkali metal hydroxide is at least 0.1 mole per liter of solution and not substantially greater than that required to precipitate all of the ferrous ions as ferrous hydroxide.

4. Method according to claim 1 wherein said treating agent contains 0.05–0.8 mole of iron hydroxide per liter of treating agent.

5. The method for the continuous removal of hydrogen sulfide from a light mineral oil distillate containing the same by contact with a regenerable, circulating, aqueous treating agent, which method comprises: contacting said distillate in liquid phase with an aqueous treating agent comprising iron hydroxide in suspension, said treating agent having been prepared by precipitating iron hydroxde from an aqueous solution containing iron ions by addition of a basic compound to said solution and acidifying the resultng suspension until its pH is below 7 and at least 4; and maintaining said distillate substantially entirely in liquid phase during said contacting; separating the contacted distillate from said treating agent; regenerating the separated treating agent in acidic condition by contact with a free-oxygen containing gas; removing elementary sulfur from the regenerated treating agent; and re-using the regenerated desulfurized treating agent for further contacting with such mineral oil distillate.

6. Method according to claim 5 wherein said sulfur removal is effected by contacting said regenerated treating agent with a mercaptan-containing mineral oil distillate free of hydrogen sulfide, and wherein said mercaptan-containing distillate is separated from the regenerated treating agent and subsequently contacted with aqueous sodium plumbite for removal of elementary sulfur and mercaptans.

7. The method of replacing the hydrogen sulfide content of a light mineral oil distillate with elementary sulfur which comprises: contacting said distillate in liquid phase with a treating agent comprising iron hydroxide in aqueous suspension and simultaneously with free-oxygen containing gas, said treating agent having been prepared by precipitating iron hydroxide from an aqueous solution containing iron ions by addition of a basic compound to said solution and acidifying the resulting suspension until its pH is below 7 and at least 4; and maintaining said distillate substantially entirely in liquid phase during said contacting.

8. The method of replacing the hydrogen sulfide content of a light mineral oil distillate with elementary sulfur which comprises: contacting said distillate in liquid phase simultaneously with free-oxygen containing gas and acidic aqueous treating agent thereby to render said distillate more suitable for treatment with aqueous sodium plumbite for removal of elementary sulfur and mercaptans therefrom, said treating agent having been prepared by reacting an 0.05–0.8 molar aqueous solution of ferrous sulfate with an alkali metal hydroxide in amount at least 0.1 mole per liter of said solution and not substantially greater than the amount required to precipitate all of the ferrous ion as ferrous hydroxide, and acidifying the resulting suspension until its pH is below 7 and at least 4; and maintaining said distillate substantially entirely in liquid phase during said contacting.

9. Method according to claim 1 wherein said acidifying is accomplished by adding an acid to the suspension.

10. Method according to claim 1 wherein said acidifying is accomplished by contacting the suspension with free-oxygen containing gas in order to oxidize ferrous hydroxide to ferric hydroxide.

KOERNER E. LEUTZ.

REFERENCES CITED

The following references are of record in the file of this patent:

UNITED STATES PATENTS

| Number | Name | Date |
| --- | --- | --- |
| 442,802 | Gardner et al. | Dec. 19, 1890 |
| 1,993,140 | Hamilton et al. | Mar. 5, 1935 |
| 2,085,523 | Belchetz et al. | June 29, 1937 |

FOREIGN PATENTS

| Number | Country | Date |
| --- | --- | --- |
| 402,488 | Germany | Sept. 16, 1924 |
| 236,230 | Great Britain | Sept. 27, 1926 |